Dec. 3, 1940.   P. S. LARSON   2,223,828
CUTTING DEVICE
Filed March 25, 1938

INVENTOR
PETER S. LARSON
BY E. M. Harrington
ATTORNEY

Patented Dec. 3, 1940

2,223,828

UNITED STATES PATENT OFFICE 2,223,828

CUTTING DEVICE

Peter S. Larson, University City, Mo.

Application March 25, 1938, Serial No. 198,054

2 Claims. (Cl. 30—296)

This invention relates generally to cutting devices and more specifically to an improved cutting device adapted for use in cutting toast and the like, the predominant object of the invention being to provide an improved cutting device which is so constructed and arranged, and is capable of such use, that a slice of toast may be cut entirely through at the encrusted marginal edge thereof, and scored, or cut partially through, at points inwardly of said encrusted marginal edge of said slice of toast in order to facilitate breaking of the toast.

Prior to this invention slices of toast have frequently been served to diners, particularly in public dining establishments, which because of toughness or brittleness, or for other reasons, could not be conveniently broken into sections of the desired size. The main purpose of the present invention, therefore, is to correct this undesirable situation by providing an improved toast cutting device which is adapted to cut entirely through the outer crust portion of the toast and score or cut partially through the portion of the toast located inwardly of the outer crust on lines on which the toast is to be broken by a diner. Thus a slice of toast may be broken into the desired small sections without the inconveniences and annoyances heretofore encountered in the use of the uncut and unscored slices of toast which were heretofore served rather generally.

Figure 1:
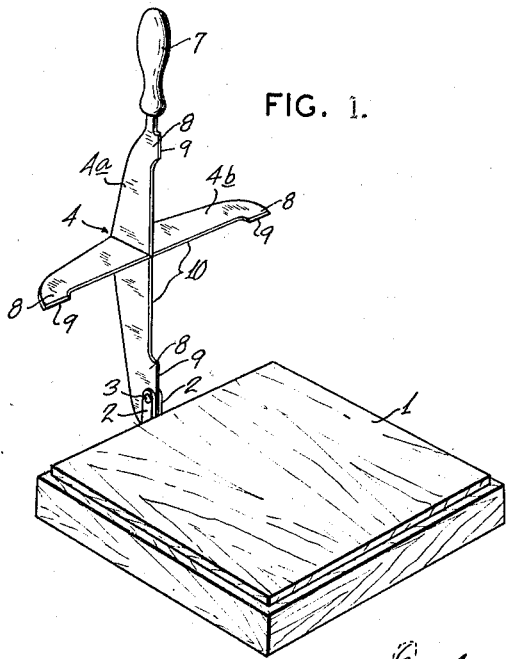
Fig. 1 is a perspective of one form of the improved device.
Figure 2:
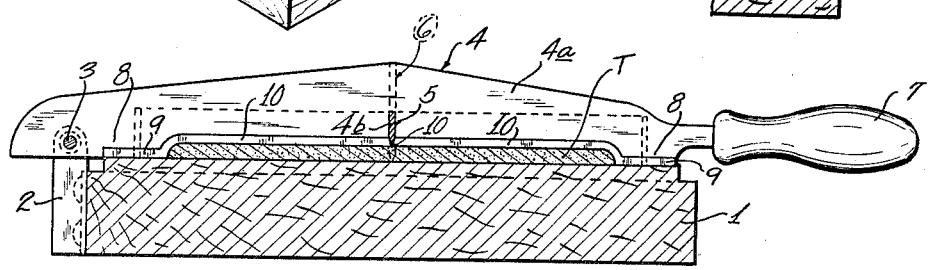
Fig. 2 is a vertical section taken through the cutting device illustrated in Fig. 1.

In the drawing, wherein is shown for the purpose of illustration, merely, several embodiments of the invention 1 designates in Figs. 1 and 2 the base of the device, said base being formed of wood or other suitable material and being of the approximate dimensions of a slice of toast. The base 1 has secured thereto at an edge face thereof a pair of spaced apart elements 2 which preferably extend slightly above the top face of the base. Secured for pivotal movement between the spaced elements 2 by means of a pivot 3 is a cutting member 4, which in the embodiment of the invention illustrated in Figs. 1 and 2 comprises a pair of cutting blades 4a and 4b arranged in cross formation. The blades 4a and 4b may be assembled in cross relation in any suitable manner, one method being to provide the blade 4a with a slot 5 that receives a lower portion of the blade 4b, and providing the blade 4b with a slot 6 which receives an upper portion of the blade 4a as shown in Fig. 2. The blades 4a and 4b are suitably secured together in their assembled condition and at the outer free end of the blade 4a a suitable handle 7 is arranged thereon to facilitate operation of the cutting member. Adjacent to the opposite ends of the blades 4a and 4b of the cutting member 4 extensions 8 are formed on said blades which are provided with cutting edges 9. Intermediate the extensions 8 the blades 4a and 4b are provided with elongated cutting edges 10 which are offset from the cutting edges of the extensions 8 so that when the cutting member 4 is disposed in its horizontal operative position as shown in Fig. 2 the cutting edges 10 of the blades 4a and 4b are in a higher plane than are the cutting edges 9 of the extensions 8.

Figure 3:
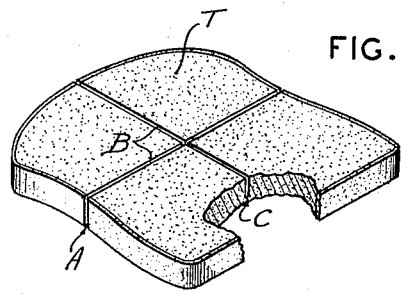
Fig. 3 is a perspective of a slice of toast illustrating the manner in which it is cut with the aid of the improved device, a portion of the slice of toast being broken away so as to better illustrate the scoring thereof.

In the use of the improved cutting device illustrated in Figs. 1 and 2 a slice of toast is placed on the top face of the base 1 as illustrated in Fig. 2, wherein the toast is designated by the reference character T. The handle 7 of the cutting member is then grasped and said cutting member moved downwardly to cut the slice of toast and the cutting edges 9 of the extensions 8 will cut entirely through the outer crust portion of the slice of toast while the cutting edges 10 of the blades will cut partially through, or score, the portion of the slice of toast located within the outer crust portion. The manner in which a slice of toast is cut with the aid of the improved device is shown to very good advantage in Fig. 3 wherein the slice of toast is designated by the reference character T. In this view the reference character A designates a cut produced by the cutting edge of one of the extensions 8 which cut extends entirely through the crust portion of the slice of toast, while the reference character B designates cross cuts produced by the cutting edges 10 which pass only partially through the thickness of the slice of toast as shown at C so as to score the toast yet permit it to remain in the form of single integral slice of toast which may be conveniently handled until the slice of toast is broken into sections. Obviously the cutting edges 10 of the blades 4a and 4b of the cutting member are prevented from passing entirely through the thickness of the slice of toast by contact of the cutting edges 9 of the extensions 8 with the base 1 of the cutting device.

It is clear that when a slice of toast has been cut with the aid of the improved cutting device disclosed herein it may be very conveniently broken into sections of the proper size.

Figure 4:
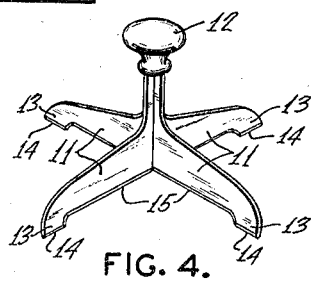
Fig. 4 is a perspective which illustrates another form of the improved device.

In Fig. 4 a simple form of the improved device is illustrated, this form of the device including blades 11 arranged in crossed relation which are provided with upwardly projected portions that receive a handle 12. The cross blades 11 of the device shown in Fig. 4 are provided with end extensions 13 having cutting edges 14, and intermediate said extensions the blades 11 are provided with elongated cutting edges 15. The device shown in Fig. 4 is used by grasping the handle 12 and moving the cutting edges of the blades 11 against a slice of toast to cut and score said slice of toast as has already been explained herein.

Figure 5:
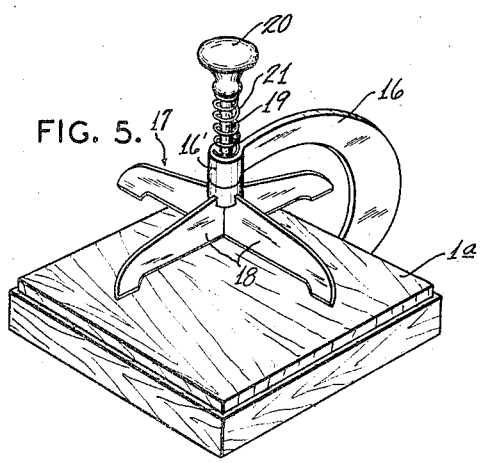
Fig. 5 is a perspective which illustrates still another form of the device.

In Fig. 5 a form of cutting device is illustrated which includes a base 1a having fixed thereto a supporting arm 16 for the cutting member 17. The cutting member 17 of the device shown in Fig. 5 includes crossed blades 18 which are provided with cutting edges arranged as already explained herein in connection with the forms of the invention illustrated in Figs. 1, 2 and 4. The cutting member includes also a stem 19 that passes through a vertical opening formed in the head portion 16' of the supporting arm 16, said stem having a handle 20 mounted thereon at its upper end, and a coil spring 21 being interposed between said handle and the top face of the head portion 16' of the supporting arm 16. In the use of this form of the invention a slice of toast is placed on the base 1a in proper position and the handle 20 is depressed against the action of the coil spring 21 to cut and score the slice of toast as has been previously described herein.

Figure 6:
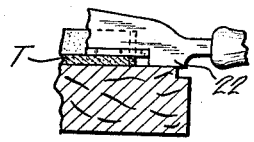
Fig. 6 is a fragmentary sectional view showing another form of the invention.

Instead of cutting entirely through the crust of a slice of toast being cut in accordance with the present invention I may increase the lengths of the blades so that the extensions 22 of said blades are located outwardly beyond the slice of toast as shown in Fig. 6 and with no cutting edges formed on said extensions. In the use of a cutting device so made a slice of toast will be scored to its outer edges without the crust of the toast being cut entirely through.

While the foregoing specification and the claims forming a part of this application refer to toast, it is to be understood that slices of bread may be cut with the aid of the improved device before said slices of bread have been toasted, or slices of toast may be cut with the aid of the improved device after the toasting operations have been completed.

I claim:

1. A cutting device for putting cuts in slices of bread and toast, comprising a base, a blade supported by said base for movement toward and from same, said blade having an intermediate portion provided with a cutting edge, and spaced portions at opposite ends of said intermediate portion which are provided with edges that are offset in the direction of the width of the blade from the cutting edge of said intermediate portion, whereby said cutting edge of said intermediate portion of the blade is spaced from said base when the edges of said spaced portions of the blade are in contact with said base.

2. A cutting device for putting cuts in slices of bread and toast, comprising a base, a blade structure supported by said base for movement toward and from same, said blade structure comprising a plurality of blades arranged in substantial cross formation each of which is provided with an end portion having an edge adapted for movement into contact with said base and an adjacent portion having a cutting edge which is offset in the direction of the width of the blade from the edge of said end portion, whereby said cutting edge of said adjacent portion of the blade is spaced from the base when the edge of said end portion of the blade is in contact with said base.

PETER S. LARSON.